April 24, 1945.  J. F. WADSWORTH, JR  2,374,249
COMBINATION TOWING CABLE AND FUEL HOSE
Filed Nov. 7, 1942
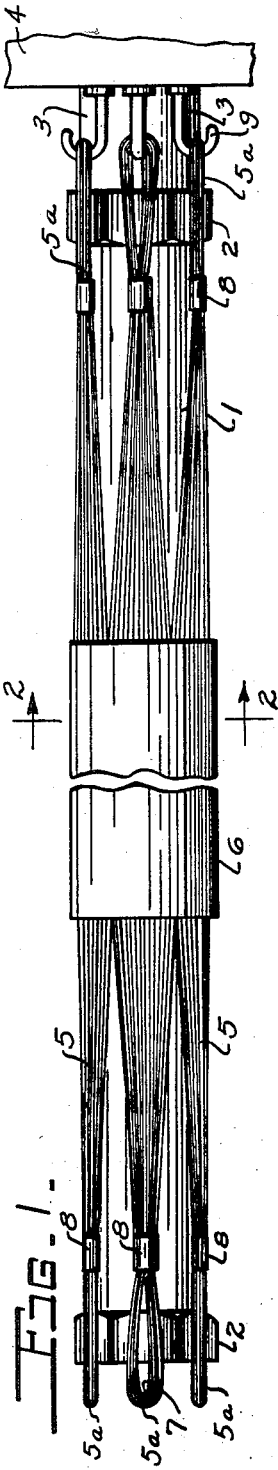
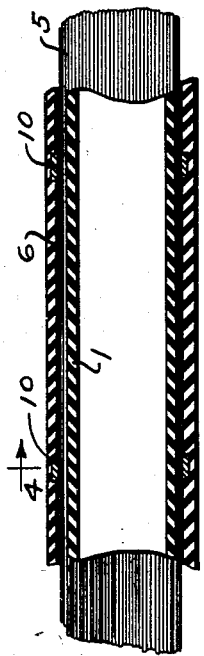
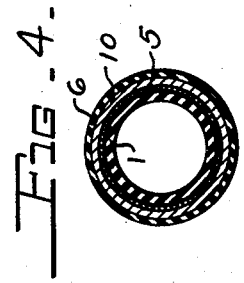
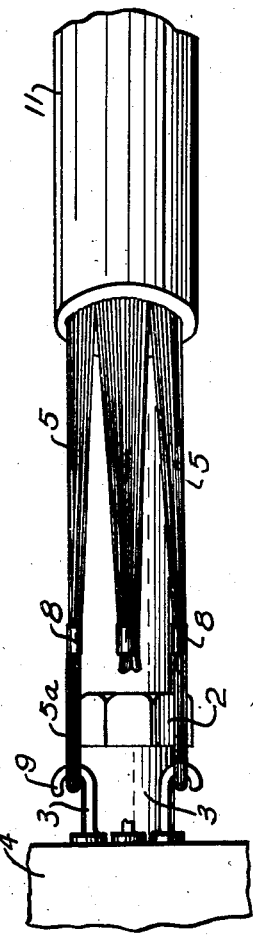
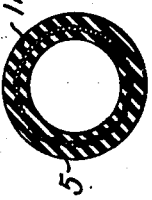
INVENTOR
JOSEPH F. WADSWORTH Jr.
By
ATTORNEYS Patented Apr. 24, 1945

2,374,249

UNITED STATES PATENT OFFICE 2,374,249

COMBINATION TOWING CABLE AND FUEL HOSE

Joseph F. Wadsworth, Jr., Barberton, Ohio

Application November 7, 1942, Serial No. 464,867

6 Claims. (Cl. 137—111)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in combined towing and fuel transfer means of the type generally shown in patent of Fairfield 1,188,426, of June 27, 1916, the improvements of the present invention having a particular reference to the manner of assembly of the hose in conjunction with the cable and to the manner of securing the cable ends to the towing and towed means.

The invention has particular applicability to towing cable and fuel transfer means for use in airplane and glider towing operations where it is desired to refuel the towing airplane from reserve fuel tanks carried by the glider being towed thereby while the airplane and glider are in flight. Such refueling operations in the past have been carried out by the employment of fuel transfer hose extending between the towing airplane and the glider being towed thereby separate from the towing cable constituting the towing interconnection between the aircraft.

Under the conditions of provision of fuel transfer hose separate from the towing interconnection, it is necessary to provide suitable reels, ropes, pulleys, and other appropriate appurtenances for winding up the fuel transfer hose on one of the towing or towed aircraft, and accomplishing the unwinding of the hose and interconnection of the same between the towing airplane and glider towed thereby when it is desired to effect transfer of fuel from one of the aircraft to the other, all of which is unsatisfactory in practical operations for the reason that it requires the auxiliary appurtenances just mentioned and additional space in the aircraft for housing the same and for other obvious reasons having to do with the operating conditions mentioned.

In the light of the foregoing, the present invention contemplates the provision of combined towing means and fuel transfer means assembled into a unitary structure designed to extend between and to interconnect the towing airplane and the glider towed thereby during flight, whereby the functions of fuel transfer and of towing interconnection between the aircraft are accomplished practically by the single unitary means by which the transfer of fuel may be accomplished expeditiously simply by operation of suitable valve means, eliminating any requirement for separate fuel hose and appurtenant reels, ropes, pulleys, etc. with their accompanying disadvantages.

In one embodiment of the invention disclosed herein the combined fuel hose and towing cable comprises a liquid conduit, a plurality of cable or wire strands disposed around said conduit and extending longitudinally thereof, and an outer sheath or covering encompassing the conduit and the strands of wire intermediate the same and said covering, the latter being substantially coextensive with the conduit and serving primarily to maintain the cable or wire strands in assembled relation to the liquid conduit as well as protecting the same. The liquid conduit and outer sheath or covering may each comprise a tube or hose of rubber, fabric, or other flexible material and the protruding ends of the wire strands at either end of the combined cable and fuel hose may conveniently be divided into a plurality of groups, each of which groups of wire strand ends is formed into a permanently fixed loop to provide quick detachable means for the combined fuel hose and cable with respect to the towing airplane and glider towed thereby in conjunction with the provision of suitable hooks or other similar means on the respective aircraft with which the permanently formed loops may be engaged and disengaged as desired.

In another embodiment of my invention, as disclosed herein, an annular member is disposed around the fluid conduit intermediate the same and the outer sheath or covering, and the strands of wire or cable are secured to this annular member so that the wire or cable strands are maintained in their initial distributed relation disposed circumferentially around the fluid conduit.

In a still further embodiment of the invention the cable or wire strands are formed integrally with the fluid conduit, being disposed within the body of material forming said conduit.

In the accompanying drawing,

Figure 1 is a view showing one embodiment of my invention and illustrating the manner of attachment of the cable ends and of the fluid conduit to appropriate attaching means such as may be provided on the aircraft or the like with which the same may be employed.

Figure 2 is a transverse sectional view through the combined cable and fuel hose taken on the line 2—2 of Figure 1.

Figure 3 is a longitudinal sectional view through a combined fuel hose and cable according to a modification of the invention employing an annular member to which the cable or wire strands are secured.

Figure 4 is a transverse sectional view taken on the line 4—4 of Figure 3.

Figure 5 is a perspective view of another modification of the invention wherein the cable or wire strands are formed integrally with the fluid conduit being disposed within the body of material forming said conduit.

Figure 6 is a transverse sectional view through the modified form of combined fuel hose and cable of Figure 5.

Now referring first to Figures 1 and 2 of the drawing the numeral 1 indicates a fluid conduit which may be composed of rubber, fabric or other suitable leak-proof material, preferably of a flexible nature, and said conduit may be provided at either end with swiveled coupling means 2, such as usually provided in connection with similar hose or liquid conduits for convenient detachable connection to the conduit inlet or outlet 3 which may be provided on the tail of the towing and on the nose of the towed aircraft as indicated at 4, for communication with the fuel tank carried thereby.

Cable means for carrying the draft load between the towing aircraft and glider towed thereby may comprise a plurality of separate wire or cable strands 5 disposed around the liquid conduit 1 and extending longitudinally thereof, and an outer sheath or covering 6 fits over and encompasses the liquid conduit 1 and the cable means intermediate the latter and said sheath or covering 6. The sheath or covering 6 may comprise hose or tubing similar to the liquid conduit 1 and of similar composition. Said covering 6 may preferably be only of sufficiently larger diameter than the liquid conduit 1 to enable the covering 6 to slip over and encompass the conduit 1 and cable strands, preferably tightly fitting thereover so as to closely confine the wire strands 5 intermediate the conduit 1 and sheath 6 so as to maintain the wire or cable strands 5 in their initially distributed relation disposed around the conduit 1.

The ends of the wire or cable strands 5 at either end of the combined cable and fuel hose will be divided into groups as illustrated in the drawing, each of which groups of strand ends is formed into a loop or eye splice 5a disposed around a suitable respective eyelet 7 and secured around the eyelet by means of a suitable clamp 8 respectively provided for the looped cable ends of each group.

Suitable attaching means for cooperation with the looped cable ends or eye splices 5a will be provided upon the respective towing and towed aircraft, and, as illustrated, such attaching means may comprise the hooks 9, over which the looped cable ends 5a may be engaged when the combined cable and fuel hose is operative to interconnect the towing airplane and glider towed thereby, and from which attaching means 9 the looped cable ends 5a may readily be disengaged when desired.

Now referring to Figures 3 and 4, there is shown a modification of the invention in which there is provided an annular member 10, disposed around the fluid conduit 1 intermediate the same and the outer sheath or covering tube 6. One or more of the annular members 10 may be provided as thought desirable, and if more than one is used, said members will be spaced at intervals throughout the length of the combined fuel hose and cable. When the annular members 10 are employed, the cable or wire strands 5 will be suitably secured to the member 10 so that said cable or wire strands 5 are maintained in their initially distributed relation, disposed circumferentially about the fluid conduit 1. The annular member or members 10 may be made of copper, brass, plastic, or other suitable materials, and the cable or wire strands 5 may be brazed or otherwise secured to said member or members 10. Preferably, though not necessarily, the cable strands or wires 5 may be secured to the inner periphery of the annular member 10 as shown, and the member 10 may be of sufficiently large outer diameter so as to cause it to be pressed into the resilient material forming the outer sheath or covering tube 6, to thereby maintain the member 10 in fixed relation respecting the combined fuel hose or cable. Or, if desired, the outer sheath or covering tube 6 may be provided with interior annular recesses into which the members 10 may be fitted, for the same purpose.

Now referring to Figures 5 and 6, there is shown a modification of the invention in which the cable or wire strands 5 are formed as an integral part of the fluid conduit 11, being disposed within the body of material forming said conduit 11 and distributed circumferentially about the same intermediate the interior passage therethrough and the outer periphery thereof. To the foregoing end the liquid conduit 11 may, for instance, be molded out of rubber or other resilient material, and the wire or cable strands 5 disposed within the body of material during the molding operation so that said cable strands or wires 5 are molded right in the body of said material. When the cable or wire strands 5 are disposed within the material of the fluid conduit itself, as just described, no outer covering or sheath 6, as used in Figures 1 to 4, will be necessary.

It will be understood that in the modifications of Figures 3 and 4, the ends of the cable or wire strands 5 will form attaching means for securing the respective ends of the cable to objects to be connected thereby, as for instance, by forming the ends of said cable or wire strands into loops or eye splices such as indicated at 5a in Figures 1 and 5.

From the foregoing it will be apparent that the construction of the invention provides a very simple and expedient means for assembling the cable or draft load carrying means in conjunction with the fuel transfer means and for attaching said draft load carrying means to the respective towing and towed aircraft in quickly detachable relation thereto.

Having thus described my invention, what I claim as new and desire to secure by Letters Patent of the United States is:

1. A combination towing cable and fuel hose, comprising in combination, an inner flexible fluid conduit, a separate outer covering tube encompassing and substantially co-extensive with said conduit, cable means comprising a plurality of wire-like strands disposed around said conduit and closely confined intermediate and extending longitudinally of said conduit and said tube, said strands protruding beyond the ends of said tube, the protruding ends of said strands being divided into a plurality of groups, an eyelet member for each group, each of said groups of strand ends being formed into a loop around its respective eyelet member, and a clamp for securing each group of strand ends to its respective eyelet member.

2. A combined towing cable and fuel hose, comprising in combination, an inner flexible fluid conduit, an outer covering tube encompassing said conduit, and cable means comprising a plurality of wire-like strands disposed intermediate and extending longitudinally of said conduit and said tube, said strands protruding beyond the ends of said tube, and a ring member disposed around the conduit intermediate the ends of the latter and intermediate the same and said tube, said strands being secured to said member, the protruding ends of said strands being divided into a plurality of groups, each of said groups of strand ends being formed into a permanently disposed loop.

3. A combined towing cable and fuel hose, comprising in combination, a flexible, fluid conduit, cable means comprising a plurality of wire-like strands extending longitudinally of said conduit and embedded within the body of material forming said conduit, and the ends of said strands being divided into a plurality of groups, each of said groups of strand ends protruding beyond the ends of said conduit and being formed into a permanently disposed loop.

4. A combination towing cable and fuel hose, comprising in combination, an inner flexible fluid conduit, a separate outer covering tube encompassing said conduit, cable means comprising a plurality of wire-like strands disposed around said conduit and closely confined intermediate and extending longitudinally of said conduit and said tube, said strands protruding beyond the ends of said tube, the protruding ends of said strands being divided into a plurality of groups, each of said groups of strand ends being formed into a permanently disposed loop.

5. A combination towing cable and fuel hose, comprising in combination, an inner flexible fluid conduit, a separate covering tube encompassing said conduit, and cable means comprising a plurality of wire-like strands disposed intermediate and extending longitudinally of said conduit and said tube, said strands protruding beyond the ends of said tube, a ring member disposed around the conduit intermediate the ends of the latter and intermediate said conduit and said tube, said strands being secured to said ring member, the protruding ends of said strands being divided into a plurality of groups, an eyelet member for each group, each of said groups of strand ends being formed into a loop around its respective eyelet member, and a clamp for securing each group of strand ends to its respective eyelet member.

6. A combined towing cable and fuel hose, comprising in combination, a flexible fluid conduit, cable means comprising a plurality of wire-like strands extending longitudinally of and protruding beyond the ends of said conduit and embedded within the body of material forming said conduit, the protruding ends of said strands being divided into a plurality of groups, an eyelet member for each group, each of said groups of strand ends being formed into a loop around its respective eyelet member, and a clamp for securing each group of strand ends to its respective eyelet member.

JOSEPH F. WADSWORTH, Jr.